United States Patent [19]

Kanczuzewski

[11] Patent Number: 5,494,389

[45] Date of Patent: Feb. 27, 1996

[54] DEVICE FOR THE RETENTION OF CARGO WITHIN A CONTAINER

[75] Inventor: Thomas E. Kanczuzewski, South Bend, Ind.

[73] Assignee: Logi-Stick, Inc., Notre Dame, Ind.

[21] Appl. No.: 46,641

[22] Filed: Apr. 13, 1993

[51] Int. Cl.$^6$ .................................................. B61D 45/00
[52] U.S. Cl. ............................................ 410/144; 410/149
[58] Field of Search ...................... 410/143–152; 211/105.1, 123; 248/912, 201, 208, 558

[56] References Cited

U.S. PATENT DOCUMENTS

| | | |
|---|---|---|
| 969,002 | 8/1910 | Teachout . |
| 1,401,419 | 12/1921 | McNally . |
| 1,951,660 | 3/1934 | Klaudt . |
| 2,124,082 | 7/1938 | Reifer . |
| 2,414,160 | 1/1947 | Moon . |
| 2,464,080 | 3/1949 | Hankins . |
| 2,467,681 | 4/1949 | McKinney . |
| 2,468,101 | 4/1949 | Nampa ..................... 410/150 |
| 2,697,631 | 12/1954 | Miller . |
| 2,752,864 | 7/1956 | McDougal, Sr. et al. . |
| 2,766,704 | 10/1956 | McMahon . |
| 2,845,245 | 5/1958 | Gray et al. ................. 248/912 |
| 2,912,939 | 11/1959 | Miner, Jr. et al. . |
| 2,980,037 | 4/1961 | Elsner . |
| 2,993,708 | 7/1961 | Holman, Jr. ............... 410/149 |
| 3,177,007 | 4/1965 | Oren . |
| 3,344,750 | 10/1967 | Kostrewa . |
| 3,559,591 | 2/1971 | Breen et al. . |
| 3,590,746 | 7/1971 | Gibson . |
| 3,712,663 | 1/1973 | Laven . |
| 3,836,174 | 9/1974 | Holman, Jr. ............... 410/149 |
| 4,026,508 | 5/1977 | Ziegler ....................... 248/912 |
| 4,080,906 | 3/1978 | Brown . |
| 4,264,251 | 4/1981 | Blatt . |
| 4,278,376 | 7/1981 | Hunter . |
| 4,396,325 | 8/1983 | Joice-Cavanagh . |
| 4,432,678 | 2/1984 | Liebel . |
| 4,498,824 | 2/1985 | Kinkle . |
| 4,616,757 | 10/1986 | Hobson ...................... 211/189 |
| 4,700,918 | 10/1987 | Andrasko, Jr. ............ 211/105.1 |
| 4,735,468 | 4/1988 | Taylor, Jr. et al. ......... 248/558 |
| 4,756,498 | 7/1988 | Frye . |
| 4,830,558 | 5/1989 | Sweeney . |
| 4,846,610 | 7/1989 | Schoenleben . |
| 4,880,342 | 11/1989 | Pradovic . |

(List continued on next page.)

FOREIGN PATENT DOCUMENTS 1209255  10/1970  United Kingdom .

OTHER PUBLICATIONS

Freight Restraint Systems Brochure–Ty–Gard by Walnut Industries, Inc., May 4, 1993.
Airbags Reduce Damage, Materials, Labor and Loading Time Brochure, Shippers Paper Products Company, May 4, 1993.
Bones Securement System Brochure, May 4, 1993.

*Primary Examiner*—Michael S. Huppert
*Assistant Examiner*—Gregory A. Morse
*Attorney, Agent, or Firm*—Barnes & Thornburg

[57] ABSTRACT

A device for the retention of cargo within a container includes a pair of opposing receptacles, and a support member disposed therebetween. Each receptacle is mounted to an opposing sidewall of the container and includes two channels therein for receiving an end of the support member. The two channels are disposed substantially orthogonally to one another, to accommodate support members disposed in different orientations. The dimensions of the two channels are different, so as to accommodate support members of differing sizes and lengths. At least one channel includes a compressive force member therein to exert a compressive force onto the support member once it is received within the channel. The support member is typically a rigid member, and may include standard cuts of number of varying cross-sectional dimensions. The device is positioned such that the support member abuts or is placed adjacent to cargo within the container, and physically prevents the cargo from shifting during transportation.

47 Claims, 4 Drawing Sheets

U.S. PATENT DOCUMENTS

| | | |
|---|---|---|
| 4,932,817 | 6/1990 | Mattare . |
| 4,955,771 | 9/1990 | Bott . |
| 4,962,907 | 10/1990 | Gary . |
| 4,982,922 | 1/1991 | Krause . |
| 5,028,184 | 7/1991 | Krause . |
| 5,156,110 | 10/1992 | Fuller ................................. 248/912 |
| 5,219,251 | 6/1993 | Kanczuzewski ..................... 410/145 |
| 5,326,204 | 7/1994 | Carlson et al. ..................... 410/143 |
| 5,370,482 | 12/1994 | Long .................................. 410/152 |

DEVICE FOR THE RETENTION OF CARGO WITHIN A CONTAINER

BACKGROUND AND SUMMARY OF THE INVENTION

The present invention relates generally to a new and novel device for the retention of cargo within a container. More particularly, the present invention relates to a restraint mechanism which limits the shifting of cargo in a trailer during shipping.

Much of the cargo transported for commercial and other uses is shipped in semi-trailers and vehicles having similar containers. Most of these trailers are generally cube-like in design, while the cargo being shipped may be of most any shape. Thus, the cargo is rarely an exact fit within the container. Even when the cargo is placed in boxes, the boxes may not fit perfectly into the container. Loading of trailers is even more complicated by the fact that not all trailers are uniform in size. At other times, the trailer or container may be only partially filled, thus leaving a void in the trailer.

In either instance, shifting or translation of the cargo within the trailer or container can occur during shipping. This is undesirable, especially when the items being shipped are fragile or perishable.

Accordingly, it is an object of the present invention to provide a device for retention of cargo within a container which prevents or limits shifting of cargo within a container during shipping or transportation.

Another object of the present invention is to provide a device for the retention of cargo within a container which can be used at various locations within a container.

Yet another object of the present invention is to provide a device for the retention of cargo within a container which can be used in compartments or containers of varying sizes.

These and other objects are attained in a retention device having a pair of receptacles, and a support member receivingly engaged therebetween. The receptacles are mounted to opposing sidewalls of a container, and opposite ends of the support member are inserted into each receptacle. Each receptacle includes a base and a plurality of walls forming a housing. Within the housing, a first channel and a second channel are formed. Both the first channel and the second channel are generally rectangular in cross-sectional dimensions, and are disposed substantially orthogonally to one another.

The first channel includes opposing sidewalls and a floor, such that the floor includes two steps therein. The two steps allow the first channel to receive support members of differing dimensions, and to positively lock the support member within the channel. The floor of the first channel includes the tops of a plurality of ribs formed in the base. The ribs extend substantially parallel to the longitudinal axis of the first channel. Adjacent the first channel is an inclined ramp, which leads up to the first channel. The ramp provides a means of easy ingress of the support member into the first channel.

The second channel includes opposing sidewalls and a floor, such that the floor comprises opposing ledges which are spaced apart by the first channel. The floor includes a compressive force means thereon which exerts a substantially compressive force on the support member when the support member is located within the second channel. The compressive force means typically comprises a spring, which may be of a generally wedge,shaped resilient com-position. A wedge-shaped member is located on each ledge of the floor of the second channel, and is resilient such that it exerts a force on a support member located in the second channel. The second channel also includes a ramp adjacent thereto, which leads up towards the second channel. The second ramp includes two angled surfaces spaced apart by the first channel.

Attached to the base opposite the rib is a means for removably attaching the retention device to the container sidewalls. One such method of removably attaching the device to the container includes an adhesive applied to the base. The base further includes a stabilizing means attached thereto. The stabilizing means may include a plurality of feet attached to the base, spaced in a generally rectangular pattern.

The first and second channels are formed within the cavity of the housing such that the floor of the first channel is displaced from the floor of the second channel. Thus, the two floors are spaced apart, in different planes. Thus, the distance between opposing first channel floors and opposing second channel floors in opposing receptacles is not equal. In this way, the retention device of the present invention may accommodate support members of different lengths.

The dimensions of the housing and first and second channels may be modified to accommodate semi-trailers or containers of differing dimensions. For example, containers used in domestic shipping may vary from containers used to ship goods internationally. Thus, a international model of the present invention may vary in dimension from a domestic model.

The present invention is specifically designed such that the support member disposed between the opposing receptacle is a standard cut of lumber. Because of the orientation of the first and second channels, as well as the steps located in the floors of the channels, several different standard cuts of lumber are receivable within the receptacles. Standard 2×2, 2×4, 4×4 and 2×6 cuts of lumber can be inserted into each receptacle, and snugly locked in place against a step in a channel floor.

Other objects, advantages and novel features of the present invention will become apparent in the following detailed description of the invention when considered in conjunction with the accompanying drawings.

DETAILED DESCRIPTION OF THE PREFERRED EMBODIMENTS

Figures 1, 2:
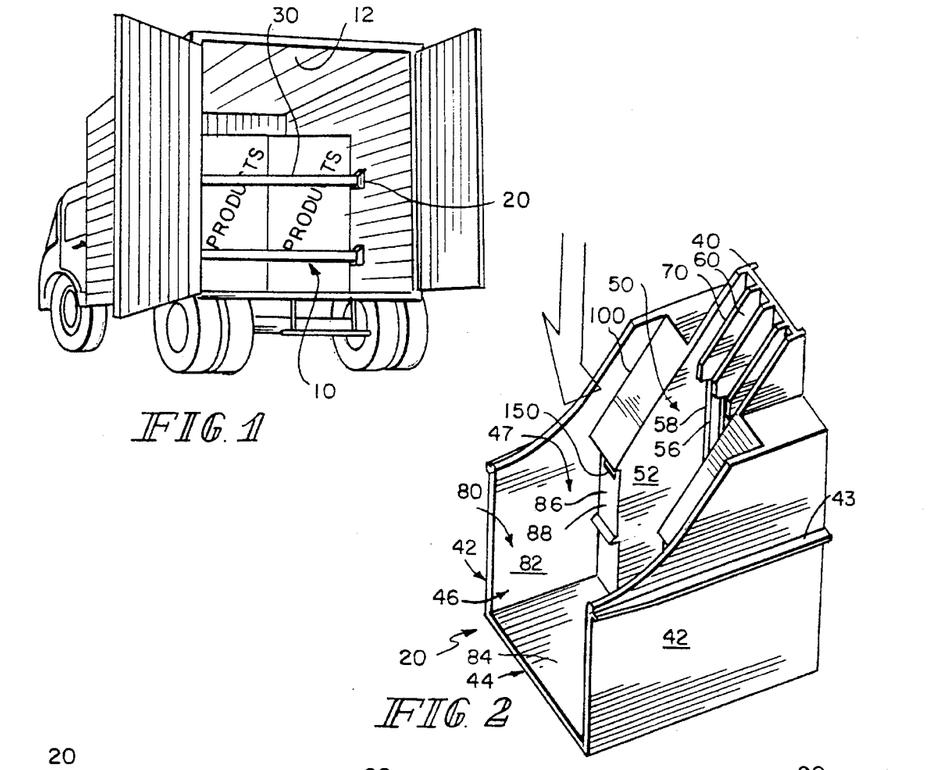
FIG. 1 is a perspective view of the retention device of the present invention, shown in use within a semi-trailer or similar container.
FIG. 2 is a perspective view of a receptacle of a retention device of the present invention.
Figure 3:
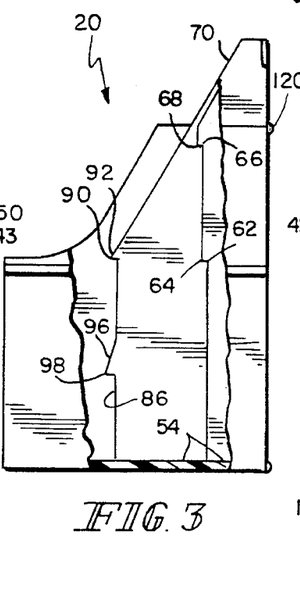
FIG. 3 is a side cut-away view of a receptacle of a retention device of the present invention.
Figure 4:
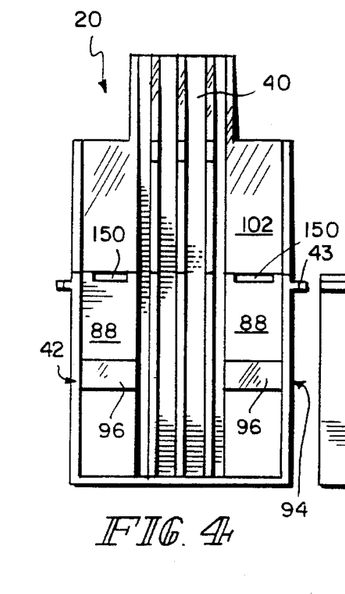
FIG. 4 is a plan view of a receptacle of a retention device of the present invention.
Figure 5:
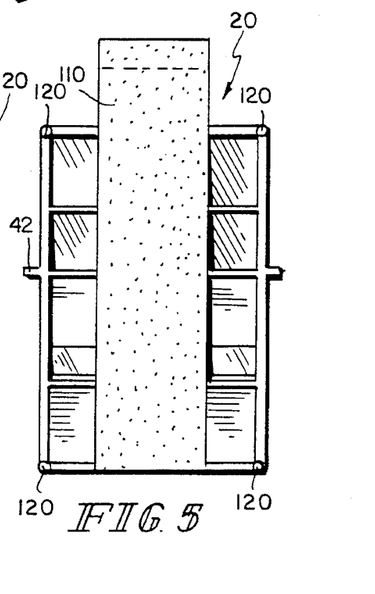
FIG. 5 is a bottom view of a receptacle of a retention device of the present invention.

FIG. 1 shows a cargo retention device of the present invention, referred generally by the reference numeral 10, in use in container 12. Retention device 10 is designed to be removably attachable to the inside walls of container 12, such as a pick-up truck bed, semi-trailer or international ocean container. The purpose of retention device 10 is to limit shifting of cargo being transported in container 12. While the illustrative embodiments show retention device 10 in use in a semi-trailer, its use is not limited to this application.

Generally, retention device 10 includes a pair of receptacles 20, and support member 30 disposed therebetween. Support member 30 is typically a generally elongate body, and is oriented substantially horizontally, extending across the width or latitude of container 12. Support member 30 is positioned flush against or in close proximity to the cargo in container 12, and thus serves as a physical barrier, limiting or preventing shifting or extensive movement of the cargo during transportation. In the embodiments shown, support member 30 is a rigid member, sturdy enough to withstand the forces of shifting cargo. In practice, support member 30 will typically be a piece of lumber. Thus, support member 30 will typically be a generally elongate member, having a substantially rectangular cross-sectional configuration. However, the present invention is not limited by the shape or composition of support member 30. For example, support member 30 may be a substantially sturdy, flexible member.

Opposite ends of support member 30 are received in and secured to opposing receptacles 20. Each receptacle 20 is removably secured to a wall of container 12, and is designed to receive an end of support member 30 therein. As illustrated, receptacle 20 may be made from a sturdy plastic. However, receptacle 20 may also be constructed from other materials.

Figure 8:
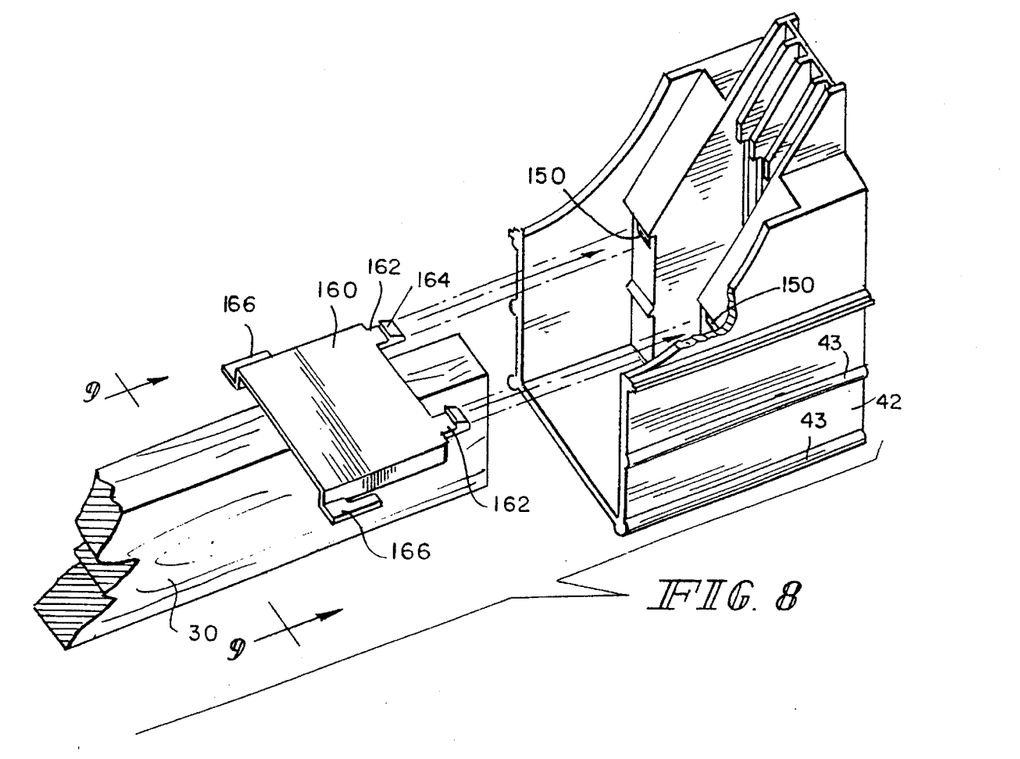
FIG. 8 is a perspective view of another illustrative embodiment of the receptacle of the present invention, showing a clip used to secure a support member within the receptacle.

As can be seen in FIG. 2, receptacle 20 includes base 40 and a plurality of walls which extend about the base. Base 40 is a generally rectangular, substantially flat member. In the illustrative embodiments shown, sidewalls 42 and back wall 44 extend substantially vertically about base 40. Sidewalls 42 extend substantially parallel to one another, and are spaced apart from base 40. Attached to an exterior surface of each sidewall 42 is brace 43. Brace 43 extends substantially the entire width of sidewall 42, and is spaced intermediately along its length. Brace 43 provides support and strength to sidewalls 42. As indicated in FIG. 8, another illustrative embodiment of receptacle 20 includes a plurality of braces 43 spaced apart along the exterior of sidewall 42.

Back wall 44 is connected to both sidewalls 42 and is oriented substantially orthogonally to both sidewalls. Back wall 44 extends from and is substantially orthogonal to base 40. Together, base 40, sidewalls 42 and back wall 44 form housing 46. Housing 46 includes cavity 47 formed therein, the cavity being generally disposed between opposing sidewalls 42 and back wall 44. Cavity 47 comprises the means for receiving an end of support member 30 within receptacle 20. In the embodiments shown, cavity 47 includes two discrete such receiving means: first channel 50 and second channel 80.

First channel 50 includes opposing sidewalls 52 and endwall 54. Sidewalls 52 extend from, and substantially orthogonal to, base 40. Sidewalls 52 extend substantially the entire length of base 40. Endwall 54 includes a portion of back wall 44, and thus extends substantially orthogonal to base 40, and is oriented substantially orthogonal to sidewalls 52. First channel 50 also includes floor 56. In the illustrative embodiments shown, floor 56 comprises top surface 58 of ribs 60. Ribs 60 are secured to base 40, and extend substantially parallel to sidewalls 52. Each rib 60 is a generally rigid member, oriented substantially orthogonally to base 40, and extending the length of the base. Retention device 10 includes three ribs 60. However, the present invention is not limited by the use or number of ribs 60.

Floor 56, and thus ribs 60, contain at least one step therein. In the embodiments shown, floor 56 includes step 62 and step 66. Steps 62 and 66 allow first channel 50 to snugly receive support members 30 of different dimensions. For example, in one illustrative embodiment, the approximate distance between endwall 54 and first step 62 is 3.625 inches. This is the approximate longitudinal cross-sectional dimension of a standard 2×4 piece of lumber. When a standard 2×4 is used as support member 30, the board may be inserted into first channel 50 such that the longitudinal cross-sectional dimensions fits snugly between endwall 54 and first step 62. Lip 64 on first step 62 acts as a lock, or stop, to prevent support member 30 from unintentionally being disengaged from first channel 50.

Second step 66 is approximately 5.625 inches from endwall 54, which is the approximate longitudinal cross-sectional dimension of a standard 2×6. Step 66 includes lip 68 thereon, which prevents unintentional disengagement of a 2×6 piece of lumber from first channel 50. As illustrated, the approximate latitudinal dimension of first channel 50 is 1.625 inches, the approximate width dimension of a standard 2×4 or 2×6. Thus, first channel 50 may receive a standard 2×4 or 2×6 piece of lumber therein, disposed such that the longitudinal cross-sectional sides of the board are substantially parallel to sidewalls 52, and one latitudinal cross-sectional side rests against floor 56.

While first channel 50 has been described herein with dimensional detail, it should be understood that the dimensions of first channel 50 may be modified, and the present invention is not limited by the dimensions of first channel 50 recited above.

Retention device 10 also includes first ramp 70. First ramp 70 is a generally triangular shaped member which is connected to base 40. In the illustrative embodiments shown, first ramp 70 is a substantially rigid member. However, in other embodiments, it may be possible to construct first ramp 70 with some resilient properties, such that when support member 30 is forced against the ramp, the ramp yields to the support member, and exerts a compressive force back onto the support member. First ramp 70 is angled upward from base 40 towards second step 66. In the embodiments shown, first ramp 70 is formed by ribs 60, as the ribs slope away from floor 56 towards base 40. First ramp 70 acts as a guide for support member 30 as it is being inserted into first channel 50.

Retention device 10 of the present invention also includes second channel 80. Second channel 80 includes sidewalls 82 and endwall 84. Sidewalls 82 comprise a portion of sidewalls 42, and endwall 84 comprises a portion of backwall 44. Second channel 80 also includes floor 86. Floor 86 comprises opposing ledges 88, which are spaced apart by first channel 50. Ledge 88 extends substantially orthogonally from sidewall 52 of first channel 50 to sidewall 42, thus further connecting first channel 50 and second channel 80 to housing 46.

Sidewalls 82 are tapered slightly, such that the distance between opposing sidewalls adjacent floor 86 is less than the distance between opposing sidewalls 82 opposite floor 86. In the illustrative embodiments shown, the distance between opposing sidewalls 82 opposite floor 86 is approximately 3.625 inches, while the distance between opposing sidewalls 82 adjacent floor 86 is approximately 3.500 inches. Thus, a standard cut of lumber having a 4 inch cross-sectional dimension may fit within second channel 80, and can be forced against sidewalls 82 until the support member rests adjacent floor 86. In this manner, opposing sidewalls 82 exert a lateral force onto support member 30.

Floor 86 includes step 90 therein. Step 90 includes lip 92 which acts as a lock, or a stop, preventing support member 30 from becoming inadvertently disengaged from second channel 80.

Second channel 80 also includes a compressive force means therein, which provides a substantially compressive force on support member 30 once it has been received within second channel 80. In the illustrative embodiments shown, the compressive force means includes spring member 94 attached to floor 86. As shown, spring member 94 comprises wedge 96. Wedge 96 is a generally triangularly shaped member which is resiliently attached to floor 86. In its rest position, wedge 96 extends beyond the surface of ledge 88. However, wedge 96 displays resilient, pliable qualities such that it may be compressed substantially flush with ledge 88 when acted on by a force directed toward the ledge. Wedge 96 includes lip 98 thereon which acts as a lock, much like lip 92.

In the illustrative embodiments shown, the approximate distance between endwall 84 and lip 98 is 1.625 inches. When a standard 2×4 piece of lumber is used as support member 30, the board may be inserted into second channel 80 such that the latitudinal cross-sectional dimension of the board fits snugly between endwall 84 and lip 98 of wedge 96. Step 90 is approximately 3.625 inches from endwall 84. Thus, when support member 30 is a standard 4×4 piece of lumber, the board will fit snugly in second channel 80, and lip 92 of step 90 will prevent the board from becoming disengaged from the channel.

When support member 30 inserted into second channel 80 is a 4×4, the board substantially covers and compresses wedge 96 towards ledge 88. Wedge 96, in turn, exerts an opposite or compressive force onto support member 30. This compressive force further secures support member 30 in place, and limits the potential for support member 30 from becoming disengaged from second channel 80.

Adjacent second channel 80, receptacle 20 includes second ramp 100. Second ramp 100 is substantially rigid, and unyielding to the forces applied to second ramp 100 by support member 30. Second ramp 100 includes opposing slant surfaces 102 which are angled from step 90 towards base 40. In the embodiments shown, slant surface 102 is angled approximately 45° from the horizontal. Slant surface 102 terminates intermediate step 90 and base 40, adjacent second step 66 of first channel 50. Second ramp 100 is a guide for support member 30 as it is inserted into second channel 80.

Figure 6:
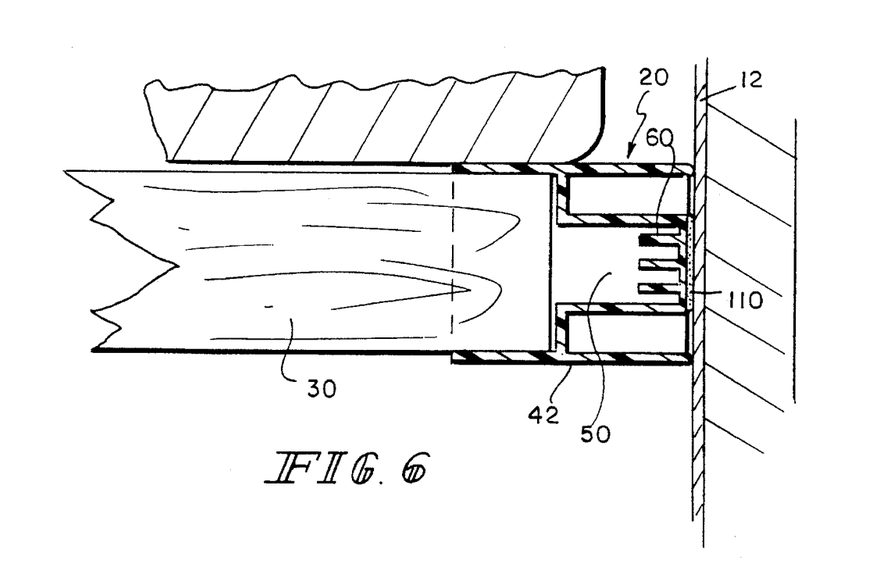
FIG. 6 is a cut-away plan view of a receptacle of a retention device of the present invention, showing a support member inserted therein in one illustrative orientation.
Figure 7:
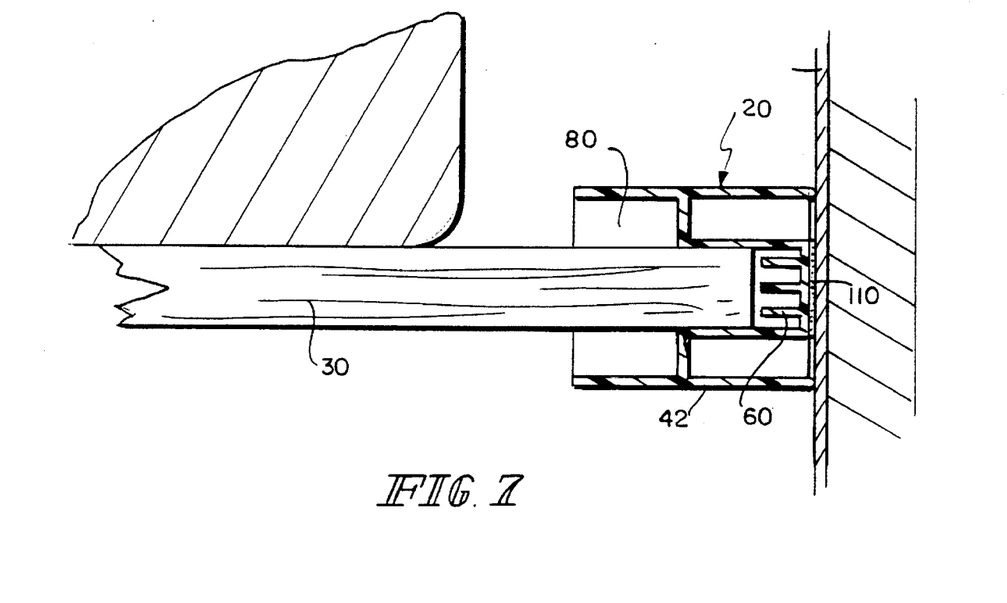
FIG. 7 is a cut-away plan view of a receptacle of a retention device of the present invention showing a support member engaged within a receptacle in a second illustrative orientation.

Both first channel 50 and second channel 80 are substantially of a rectangular cross-section, as can be seen in FIG. 6. As can be easily seen, first channel 50 is disposed substantially orthogonally to second channel 80. Thus, a support member 30 of certain dimensions may fit snugly into first channel 50 or second channel 80. For example, a 2×4 may be inserted into first channel 50, such that the longitudinal cross-sectional sides of the board fit snugly against sidewalls 52, and is secured in place by lip 64. Or, the 2×4 board may be inserted into second channel 80, such that the latitudinal cross-sectional dimensions of the board rest adjacent sidewalls 82, such that the board is secured in position by lip 98 of wedge 96.

On the other hand, support member 30 of certain dimensions may be receivable in only one of the two channels. For example, in the illustrative embodiments shown, a standard 4×4 would be snugly receivable within second channel 80, but not within first channel 50. Likewise, a standard 2×6 would be receivable within first channel 50, but not within second channel 80.

As discussed earlier, the dimensions of first channel 50 and second channel 80 may be modified to accommodate various support members 30, and the present invention is not limited by any particular dimension.

Receptacle 20 also includes means for substantially preventing the inadvertent disengagement of support member 30 from receptacle 20. One illustrative embodiment of this means includes holes 150 and clip 160. As can be seen in FIG. 8, receptacle 20 includes holes 150 in floor 86 of second channel 80. In the illustrative embodiments shown, holes 150 are positioned in floor 86 adjacent step 90.

Figure 9:
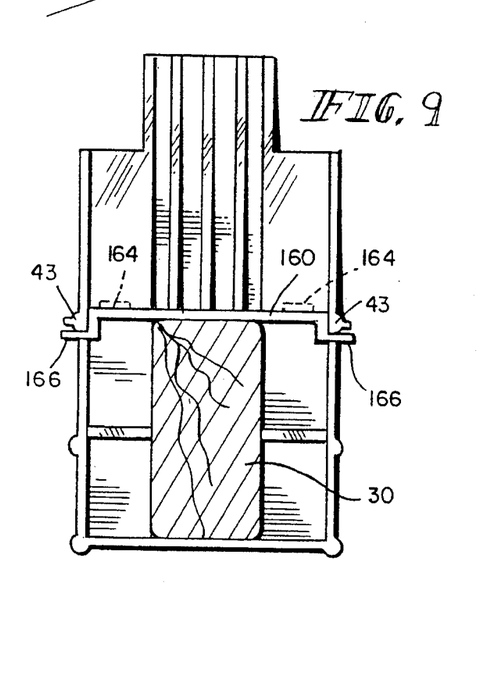
FIG. 9 shows a view of the support member and receptacle of the present invention, taken along a line 9—9 in FIG. 8.
Figure 10:
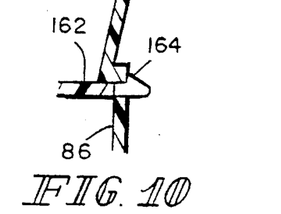
FIG. 10 shows the engagement of the tang on the clip within the hole in the receptacle of the present invention.

Clip 160 is designed to be receivably engaged within holes 150, and therefore act as a physical barrier or blocking member, preventing the inadvertent removal of support member 30 from receptacle 20. Clip 160 includes a pair of opposing tangs 162 thereon. Tangs 162 are spaced apart, and may be receivably engaged by holes 150. Each tang 162 includes lip 164 thereon. Once received in hole 150, lip 164 prevents disengagement of clip 160. Opposite tangs 162, clip 160 includes opposing shoulders 166. When clip 160 is inserted into hole 150, shoulders 166 slide over the top of sidewall 42, and rest substantially adjacent brace 43. This can be seen in FIG. 9. When support member 30 exerts a force upon clip 160, shoulders 166 contact brace 43, and thereby gain the additional strength and rigidity provided by the brace.

Receptacle 20 of the present invention is removably mounted to container 12 in such a way as to allow for easy application and removal of the device. In the illustrative embodiments shown, receptacle 20 includes adhesive 110 located on base 40, opposite ribs 60. Adhesive 110 may be any appropriate bonding agent which allows receptacle 20 to be removably attached to the walls of container 12. Two such adhesives are acrylic and rubber based extruded adhesive.

Receptacle 20 also includes a stabilizing means for stabilizing or securing receptacle 20 against a sidewall of container 12. The stabilizing means includes a plurality of feet 120 secured to base 40, opposite ribs 60. Each foot 120 projects substantially orthogonally from base 40. In the embodiments shown, receptacle 20 includes four feet 120, spaced apart in a generally rectangular orientation.

Retention device 10 also includes a means for providing easy removal of receptacle 20 from container 12. Receptacle 20 includes slot 130 in base 40, opposite ribs 60. Slot 30 provides a means by which a user can position a pry bar or similar tool between receptacle 20 and container 12, to pry the receptacle loose from the container wall.

Figure 11:
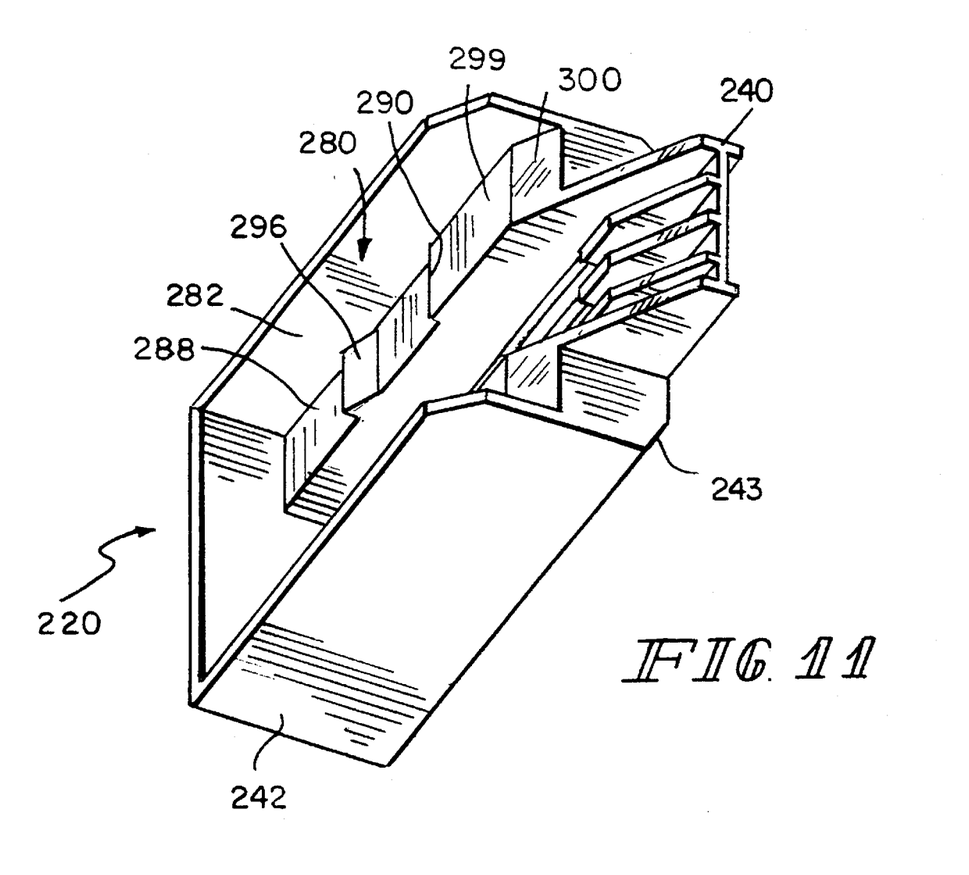
FIG. 11 is a perspective view of another illustrative embodiment of a receptacle of a retention device of the present invention.

In a second illustrative embodiment, shown in FIG. 11, the basic structure of receptacle 220 is similar to that of receptacle 20. However, there are a few design differences. Sidewalls 242 terminate short of base 240, and include angled edge 243 thereon. As shown, angled edge 243 is angled approximately 25° from the horizontal. Angled edge 243 allows receptacle 220 to fit containers of international design.

Receptacle 220 includes first channel 250, having features similar to first channel 50. Receptacle 220 also includes second channel 280, which is similar to second channel 80, but with some design differences. Sidewalls 282 do not extend as far beyond ledge 288 as in receptacle 20. Another difference is floor 286. Floor 286 includes step 290 and wedge 296. However, floor 286 also includes surface 299, which extends from step 290 to the incline of second ramp 300. Also, receptacle 220 may not include feet on base 240.

The design differences between receptacle 20 and receptacle 220 are in response to slight variations in containers used in the United States, compared to those used abroad. Thus, receptacle 20 is designed primarily for domestic use, while receptacle 220 is designed primarily for international use.

When container 12 is filled or partially filled with cargo, retention device 10 of the present invention may be used to prevent or limit the cargo from shifting during transportation. A receptacle 20 (or 220) is removably attached to opposing walls of container 12. Adhesive 110 is exposed, and receptacle 20 is pressed against the container wall. Receptacle 20 may be oriented such that base 40 is substantially parallel to the wall of container 12, and back wall 44 of receptacle 20 is substantially orthogonal to the container wall. Back wall 44 is positioned nearest the floor of container 12 and first ramp 70 is positioned nearest the ceiling (if any) of container 12. Thus, first channel 50 and second channel 80 are substantially open and accessible from above. This orientation can be seen in FIG. 2. The direction of the arrow in FIG. 2 generally indicates the direction in which support member 30 is receivably engageable by receptacle 20. Receptacle 20 may also be positioned against a wall of container 12 such that its orientation is rotated approximately 90 degrees from that described above.

After opposing receptacles 20 have been attached to container 12, support member 30 is placed between the two receptacles. Support member 30 may be any member which may be snugly received within first channel 50 or second channel 80, and will typically be a standard cut of lumber. Support member 30 is preferably of a length such that it will snugly fit between floors 56 or floors 86 of opposing receptacles 20. As floor 56 is displaced from floor 86 in receptacle 20, the distance between opposing floors 86 is less than the distance between opposing floors 56. Thus, retention device 10 of the present invention may accommodate support members 30 of differing lengths.

Once support member 30 is selected, it is positioned in a substantially horizontal orientation, raised slightly above opposing receptacles 20. If support member 30 is to be inserted into first channel 50, the support member is placed adjacent first ramp 70; if the support member is to be inserted into second channel 80, it is placed adjacent second ramp 100.

Support member 30 is then lowered until it contacts first ramp 70 or second ramp 100. After support member 30 contacts the ramp, it is further lowered toward the corresponding channel. In the illustrative embodiments shown, as support member 30 contacts the ramp, and is lowered toward the channel, the support member exerts a force onto each receptacle 20. As receptacle 20 is substantially rigid, the receptacle thus exerts a force on the walls of container 12. As the wall of container 12 exhibit some resilient properties, the walls give in response to the force, thereby lodging retention device 10 between opposing container walls. In turn, the container walls exert a substantially compressive force onto each receptacle 20, and thereby support member 30. Thus, the walls of container 12 are slightly bowed when retention device 10 is firmly locked in place. In other illustrative embodiments, each ramp may display some resilient property and thereby the force exerted by support member 30 onto receptacle 20 is not distributed to the walls of container 12. In these embodiments, portions of receptacle 12 give in response to the force exerted by support member 30, and thereby exert a responsive compressive force upon support member 30.

Support member 30 is positioned into either first channel 50 or second channel 80 until it contacts back wall 44. In this position, support member 30 is locked in place by the appropriate step, depending upon the dimensions of support member 30 and the channel within which it is received. When support member 30 of the appropriate dimensions is received within second channel 80, wedge 96 exerts a compressive force on the support member, thus further securing its placement.

Retention device 10 may be removed from container 12 by various methods. One illustrative method of removing retention device 10 is to pry clip 160 from its engagement within hole 150. Typically, tangs 162 will break as clip 160 is pried from hole 150. A force is exerted against the lip member acting as a stop against support member 30. This allows a user to lift support member 30 from its engagement with a receptacle 20. Support member 30 can then be lifted from opposite receptacle 20 and removed from container 12. Next a pry bar or similar tool is inserted into slot 130 between receptacle 20 and container 12. Receptacle 12 is then pried loose from its attachment to container 12.

Retention device 10 may also be removed from container 12 by breaking or splitting support member 30, and removing the pieces from receptacle 20. Receptacle 20 can then be stripped from the sidewalls of container 12 utilizing slot 130. Retention device 10 may also be removed by breaking or disassembling receptacle 20 from its engagement with container 12.

Although the present invention has been described in detail, including particular dimensional detail, this detail is by way of illustration and example only and is not to be taken as a limitation of the present invention. The scope and content of the present invention is defined only by the terms of the appended claims.

What is claimed is:

1. A device for the retention of cargo within a container said container having opposing sidewalls, said device comprising:

a support member having first and second ends;

a pair of receptacles removably mountable to said container sidewall, each said receptacle having a base positioned substantially adjacent the container sidewall, and including opposing walls, and two channels disposed substantially between the opposing walls and back wall;

wherein said first channel receives an end of said support member when said support member is disposed in a first orientation, and said second channel receives an end of said support member when said support member is disposed in a second orientation;

wherein the first channel includes opposing sidewalls and a floor, the floor including at least one step therein, such that said step positively locks said support member in said first channel;

wherein said first channel floor includes two steps therein to accommodate support members of more than one cross-sectional dimension; and wherein said first channel floor comprises a plurality of ribs.

2. The device according to claim 1 wherein said ribs extend substantially parallel to the longitudinal axis of said first channel.

3. The device according to claim 1 further including a first inclined ramp positioned adjacent to and leading upward to said first channel.

4. The device according to claim 1 wherein second channel includes sidewalls and a floor, said floor including opposing ledges, spaced apart by said first channel.

5. The device according to claim 4 wherein said floor includes means for exerting a compressive force on said support member when said support member is received within said second channel.

6. The device according to claim 5 wherein said compressive force means includes a spring connected to said floor of said second channel.

7. The device according to claim 6 wherein said spring is a generally wedge-shaped, resilient member.

8. The device according to claim 4 wherein said device includes a wedge-shaped member on each ledge of said floor of said second channel.

9. The device according to claim 4 including a second inclined ramp positioned adjacent said second channel, wherein said inclined ramp leads up to said second channel.

10. The device according to claim 9 wherein said second ramp includes two ramp sections spaced apart by said first channel.

11. The device according to claim 1, including means attached to said base for removably attaching said device to said container sidewalls.

12. The device according to claim 11, wherein said means includes an adhesive applied to said base.

13. The device according to claim 1 further including means attached to said base for stabilizing said device against said container sidewalls.

14. The device according to claim 13 wherein said stabilizing means includes a plurality of feet attached to said base.

15. The device according to claim 1 including means for preventing removal of said support member from said receptacle.

16. The device according to claim 15 wherein said means includes a clip engageable with said receptacle, said clip for physically blocking removal of said member from said receptacle.

17. A receptacle for receiving a support member for use in the retention of cargo during shipping, comprising:

a base;

a plurality of sidewalls extending about said base to form a cavity therebetween;

a first channel within said cavity for receiving an end of said support member therein, said first channel having a substantially rectangular cross-sectional configuration;

a second channel within said cavity for receiving an end of said support member therein, said second channel having a substantially rectangular cross-sectional configuration whereby said second channel is disposed substantially orthogonally with respect to said first channel;

wherein the first channel includes sidewalls and a floor, the floor including at least one step therein, such that the step positively locks said support member within the first channel;

wherein said first channel includes sidewalls and a floor, said floor including at least one step therein such that the step positively locks said support member within said first channel; and wherein said first channel floor includes two steps therein to accommodate support members of more than one cross-sectional dimension.

18. The device according to claim 17 wherein said floor comprises a plurality of ribs.

19. The device according to claim 18 wherein said ribs extends substantially parallel to a longitudinal axis of said first channel.

20. The device according to claim 17 further including a first inclined ramp positioned adjacent to and leading upward to said first channel.

21. The device according to claim 17 wherein second channel includes sidewalls and a floor, said floor including opposing ledges, spaced apart by said first channel.

22. The device according to claim 21 wherein said floor includes means for exerting a compressive force on said support member when said support member is received within said second channel.

23. The device according to claim 22 wherein said compressive force means includes a spring connected to said floor of said second channel.

24. A device for receiving a support member therein, said device and said support member for retaining cargo during shipping, comprising:

a base;

a plurality of side walls extending about said base to form a cavity therebetween;

at least one channel formed within said cavity;

said channel including side walls and a floor, wherein said floor includes two steps therein, said steps providing a positive lock against the removal of said support member from said channel;

an inclined ramp positioned adjacent said channel, such that the ramp leads to the channel; and wherein the floor comprises a plurality of ribs.

25. The device according to claim 24 wherein said device includes a wedge-shaped member on each ledge of floor of said second channel.

26. The device according to claim 17 including a second inclined ramp positioned adjacent said second channel, wherein said inclined ramp leads up to said second channel.

27. The device according to claim 26 wherein said second ramp includes two ramp sections spaced apart by said first channel.

28. The device according to claim 17 including means attached to said base for removably attaching said device to said container sidewalls.

29. The device according to claim 28 wherein said means includes an adhesive applied to said base.

30. The device according to claim 17 further including means attached to said base for stabilizing said device against said container sidewalls.

31. The device according to claim 30 wherein said stabilizing means includes a plurality of feet attached to said base.

32. The device according to claim 17 including means for preventing removal of said support member from said receptacle.

33. The device according to claim 32 wherein said means includes a clip engageable in said receptacle, said clip for physically blocking removal of said member from said receptacle.

34. A device for receiving a support member therein, said device and support member for retaining cargo during shipping, comprising:
a base;
a plurality of side walls extending about said base to form a cavity therebetween;
a first channel and a second channel formed within said cavity, each said channel for selectively receiving an end of said support member; and
a generally wedge-shaped member disposed substantially within said channel for exerting a compressive force onto the support member.

35. A device for receiving a support member therein, said device and support member for retaining cargo during shipping, comprising:
a plurality of sidewalls extending about said base to form a cavity therebetween;
at least two channels formed within said cavities;
wherein each channel includes sidewalls and a floor,
wherein said floor includes at least one step therein, said step providing a positive lock against the removal of said support member from said channel and wherein at least two of the channels are positioned orthogonally to one another; and
wherein said floor includes two steps therein.

36. The device according to claim 35 including an inclined ramp positioned adjacent said channel, such that said ramp leads to said channel.

37. The device according to claim 36 wherein said floor comprises a plurality of ribs.

38. The device according to claim 35 further including a second channel formed within said cavity.

39. The device according to claim 38 wherein said first and second channels have substantially rectangular cross-sectional configurations, such that said first and second channels are disposed substantially orthogonally to one another.

40. The device according to claim 38 wherein said second channel includes a floor, said floor having means attached thereto for exerting a compressive force against said support member.

41. The device according to claim 38 wherein said second channel includes an inclined ramp positioned adjacent thereto, such that said inclined ramp leads up to said second channel.

42. The device according to claim 35 wherein said base includes a means for stabilizing said device with respect to said container.

43. The device according to claim 42 wherein said stabilizing means includes a plurality of feet attached to said base.

44. A device for the retention of cargo within a container, said container having opposing side walls, said device comprising:

a support member having first and second ends;
a pair of receptacles removably mountable to said container side wall, said receptacles for receivingly engaging
said support member therebetween;
each said receptacle including a base and a plurality of walls forming a housing, and a first channel and a second channel formed within said housing;
wherein said first channel receives an end of said support member when said support member is disposed in a first orientation, and said second channel receives an end of said support member when said support member is disposed in a second orientation;
wherein the second channel includes side walls and a floor, the floor including opposing ledges, spaced apart by said first channel;
wherein the floor includes a means for exerting a compressive force on said support member when said support member is received within the second channel, the means includes a spring connected to said floor of said second channel; and
wherein said spring is generally wedge-shaped, resilient member.

45. A receptacle for receiving a support member for use in the retention of cargo during shipping, comprising:
a base;
a plurality of side walls extending about said base to form a cavity therebetween;
a first channel within said cavity for receiving an end of said support member therein, said first channel having a substantially rectangular cross-sectional configuration;
a second channel within said cavity for receiving an end of said support member therein, said second channel having a substantially rectangular cross-sectional configuration, whereby said second channel is disposed substantially orthoganally with respect to said first channel;
wherein the second channel includes side walls and a floor, the floor including opposing ledges, spaced apart by the first channel; and
wherein the floor includes means for exerting a compressive force on the support member when the support member is received within the second channel, and wherein said compressive force means includes a spring connected to the floor of the second channel.

46. The device according to claim 45 wherein said spring is a generally wedge-shaped, resilient member.

47. A device for the retention of cargo within a container, said container having opposing side walls, said device comprising:
a support member having first and second ends;
a pair of receptacles removably mountable to said container side walls, said receptacles for receiving said support member therein; and
wherein each said receptacle includes a generally wedge-shaped resilient member therein for exerting a compressive force on said support member.

* * * * *